(12) United States Patent
He

(10) Patent No.: US 11,483,768 B2
(45) Date of Patent: Oct. 25, 2022

(54) METHODS AND APPARATUS TO FACILITATE PDCCH MONITORING IN CARRIER AGGREGATION FOR LOWER POWER CONSUMPTION

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 16/795,390

(22) Filed: Feb. 19, 2020

(65) Prior Publication Data

US 2020/0314671 A1 Oct. 1, 2020

Related U.S. Application Data

(60) Provisional application No. 62/825,738, filed on Mar. 28, 2019.

(51) Int. Cl.
*H04W 52/02* (2009.01)
*H04W 24/08* (2009.01)
(Continued)

(52) U.S. Cl.
CPC ....... *H04W 52/0225* (2013.01); *H04L 5/0092* (2013.01); *H04W 24/08* (2013.01); *H04W 28/0284* (2013.01); *H04W 52/0216* (2013.01); *H04W 72/042* (2013.01); *H04W 76/28* (2018.02)

(58) Field of Classification Search
CPC ......... H04W 4/18; H04W 4/20; H04W 16/24; H04W 24/00; H04W 24/02; H04W 24/08; H04W 28/16; H04W 28/26; H04W 52/0209; H04W 52/0225; H04W 52/0245;
(Continued)

(56) References Cited

U.S. PATENT DOCUMENTS 9,042,315 B2 * 5/2015 Lin ........................ H04W 76/15
370/329
9,131,363 B2 * 9/2015 Vujcic ................... H04W 24/02
(Continued)

FOREIGN PATENT DOCUMENTS

EP 3139658 A1 3/2017

OTHER PUBLICATIONS

Intel, R1-1812513, Eu adaptation to the traffic and UE power consumption, 3GPP, Nov. 2018.*
(Continued)

*Primary Examiner* — Jason E Mattis
(74) *Attorney, Agent, or Firm* — Procopio, Cory, Hargreaves & Savitch/Qualcomm Incorporated

(57) ABSTRACT

The present disclosure relates to technique for facilitating PDCCH monitoring in carrier aggregation for lower power consumption. A UE monitors a physical downlink control channel (PDCCH) on a secondary cell (SCell). The UE stops the PDCCH monitoring on the SCell in response to a monitoring-stoppage event. Then, the UE resumes the PDCCH monitoring on the SCell in response to a monitoring-resumption event. The SCell may remain active during a period between the stopping of the PDCCH monitoring and the resuming of the PDCCH monitoring.

25 Claims, 11 Drawing Sheets

(51) Int. Cl.
*H04W 72/04* (2009.01)
*H04W 76/28* (2018.01)
*H04W 28/02* (2009.01)
*H04L 5/00* (2006.01)

(58) Field of Classification Search
CPC ........... H04W 72/042; H04W 72/0453; H04W 76/04
USPC .......................................... 370/310, 328, 465
See application file for complete search history.

(56) References Cited

U.S. PATENT DOCUMENTS

| | | | | |
|---|---|---|---|---|
| 9,414,340 | B2* | 8/2016 | Dinan | H04W 74/0833 |
| 9,479,315 | B2* | 10/2016 | Khay-Ibbat | H04L 5/001 |
| 9,485,765 | B2* | 11/2016 | Kim | H04W 72/042 |
| 9,491,793 | B2* | 11/2016 | Pelletier | H04L 5/001 |
| 9,655,160 | B2* | 5/2017 | Feuersaenger | H04L 5/0062 |
| 9,794,819 | B2* | 10/2017 | Zuo | H04W 24/10 |
| 9,820,264 | B2* | 11/2017 | Dinan | H04W 72/0413 |
| 9,872,336 | B2* | 1/2018 | Dinan | H04L 5/0096 |
| 9,923,690 | B2* | 3/2018 | Ekpenyong | H04L 5/1469 |
| 10,327,236 | B2* | 6/2019 | Dinan | H04L 5/00 |
| 10,342,034 | B2* | 7/2019 | Lee | H04W 76/20 |
| 10,631,243 | B2* | 4/2020 | Fujishiro | H04W 76/10 |
| 10,856,227 | B2* | 12/2020 | Liao | H04W 52/0229 |
| 10,887,839 | B2* | 1/2021 | Xu | H04L 5/0053 |
| 11,095,421 | B2* | 8/2021 | Gauvreau | H04W 72/0453 |
| 11,116,032 | B2* | 9/2021 | Zhou | H04W 72/1289 |
| 2013/0237208 | A1 | 9/2013 | Vujcic | |
| 2014/0192740 | A1* | 7/2014 | Ekpenyong | H04L 5/0035 370/329 |
| 2015/0043489 | A1* | 2/2015 | Tseng | H04W 24/02 370/329 |
| 2015/0230286 | A1 | 8/2015 | Feuersaenger et al. | |
| 2016/0057800 | A1* | 2/2016 | Ingale | H04L 5/0032 370/216 |
| 2016/0119969 | A1* | 4/2016 | Vajapeyam | H04W 24/10 370/329 |
| 2019/0021052 | A1* | 1/2019 | Kadiri | H04W 76/27 |
| 2019/0200413 | A1 | 6/2019 | Hong | |
| 2020/0092813 | A1* | 3/2020 | Kim | H04W 52/0229 |
| 2020/0313834 | A1* | 10/2020 | He | H04W 76/15 |
| 2020/0314671 | A1* | 10/2020 | He | H04W 72/042 |
| 2020/0396686 | A1* | 12/2020 | Tiirola | H04W 52/02 |
| 2021/0376975 | A1* | 12/2021 | Kim | H04L 5/0035 |

OTHER PUBLICATIONS

Nokia, R1-18113621, on EU power saving triggering machanisms, 3GPP, Nov. 2018.*
Qualcomm, R1-1813447, UE adaptation to the traffic and UE power consumption, 3GPP, Nov. 2018.*
Qualcomm, R1-1813448, Triggering adaptation of UE power consumption characteristics, 3GPP, Nov. 2018.*
International Search Report and Written Opinion—PCT/US2020/019034—ISA/EPO—dated Jun. 9, 2020.

* cited by examiner

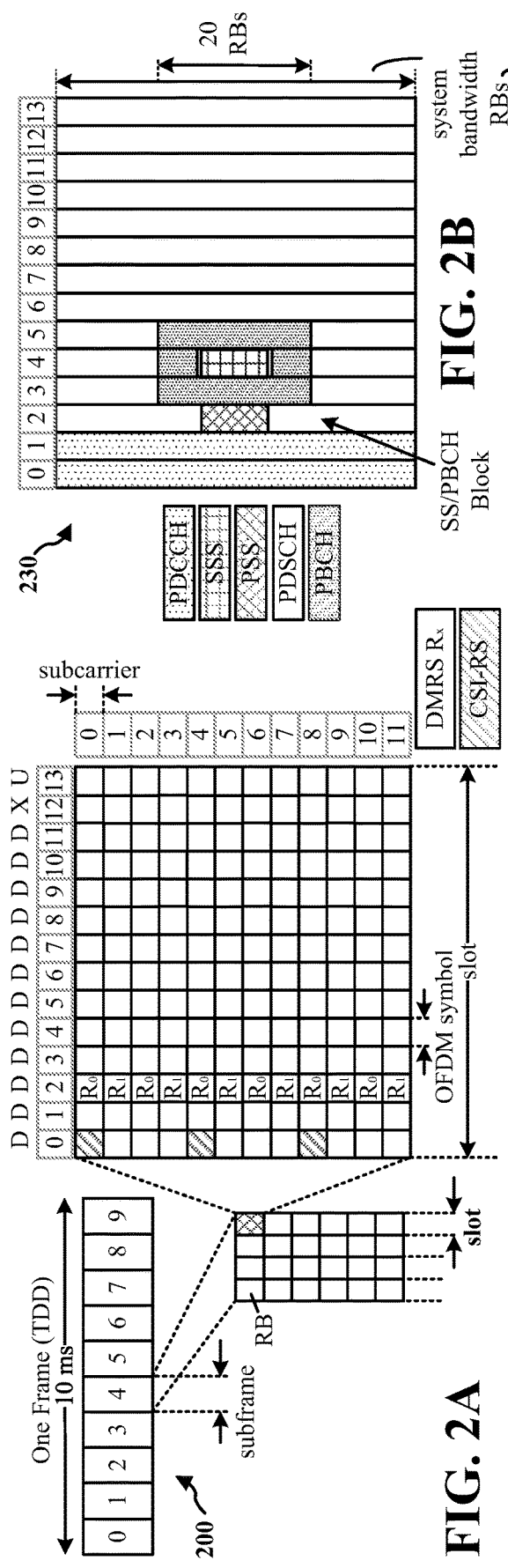
FIG. 2A
FIG. 2B
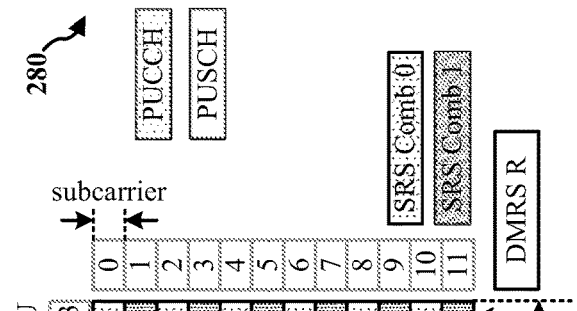
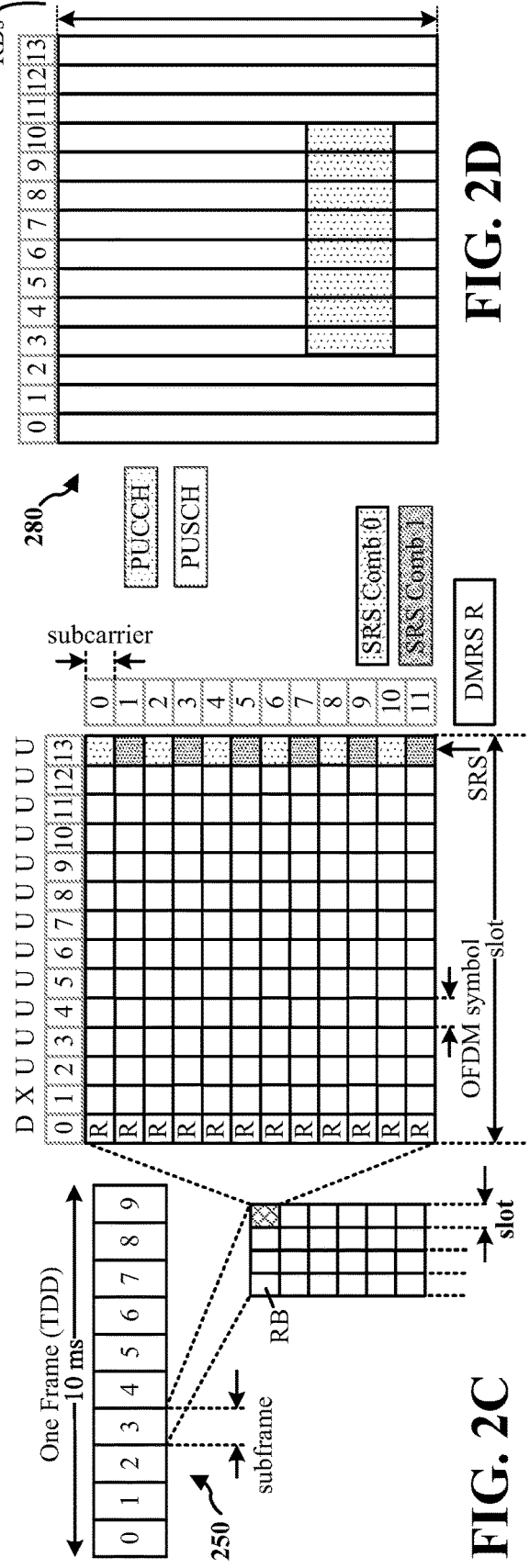
FIG. 2C
FIG. 2D

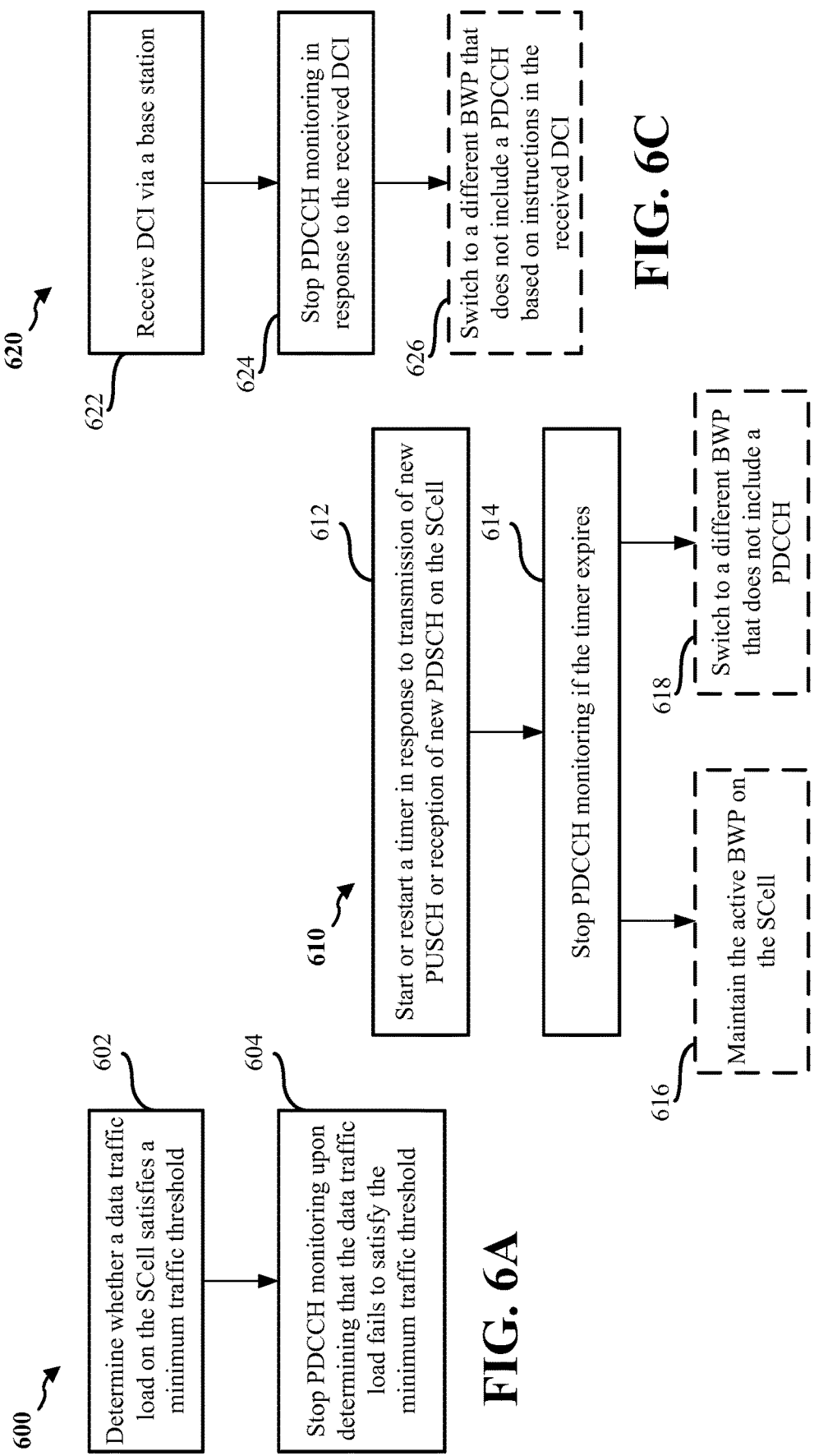

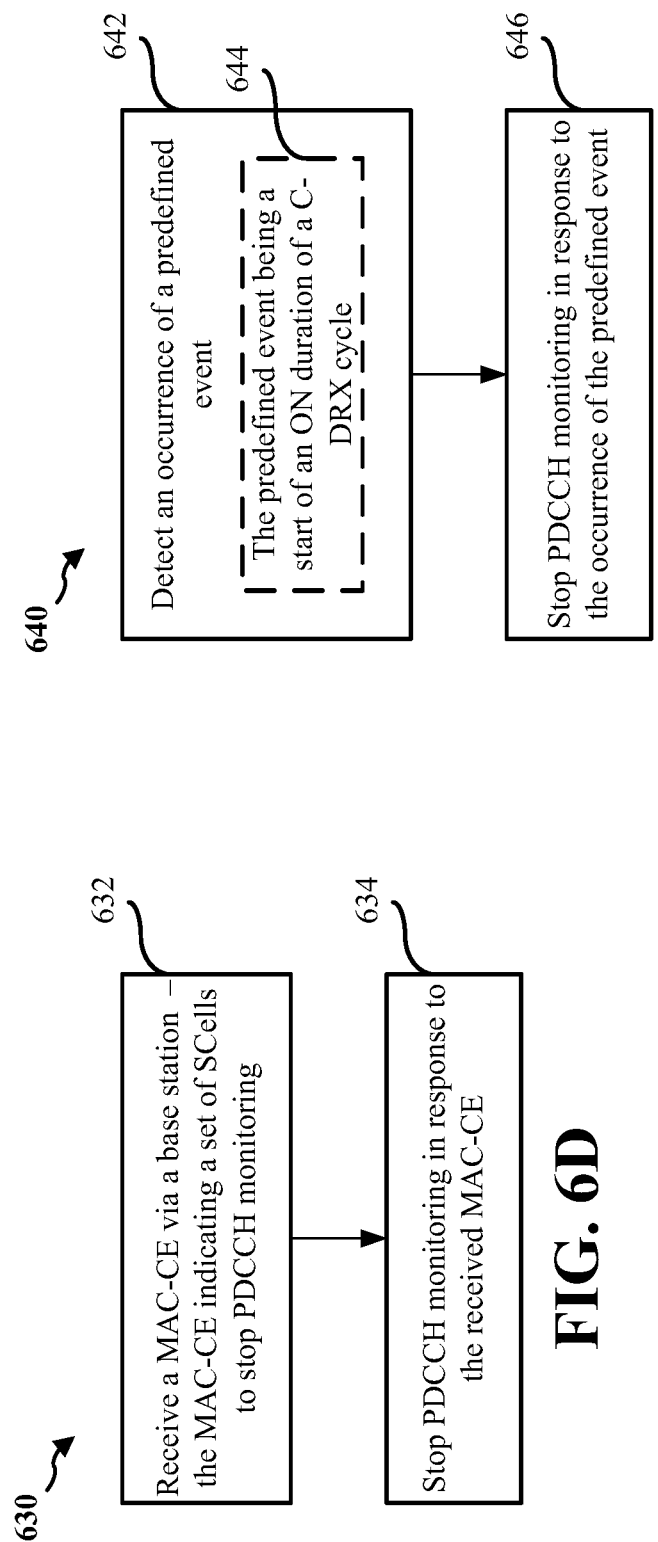

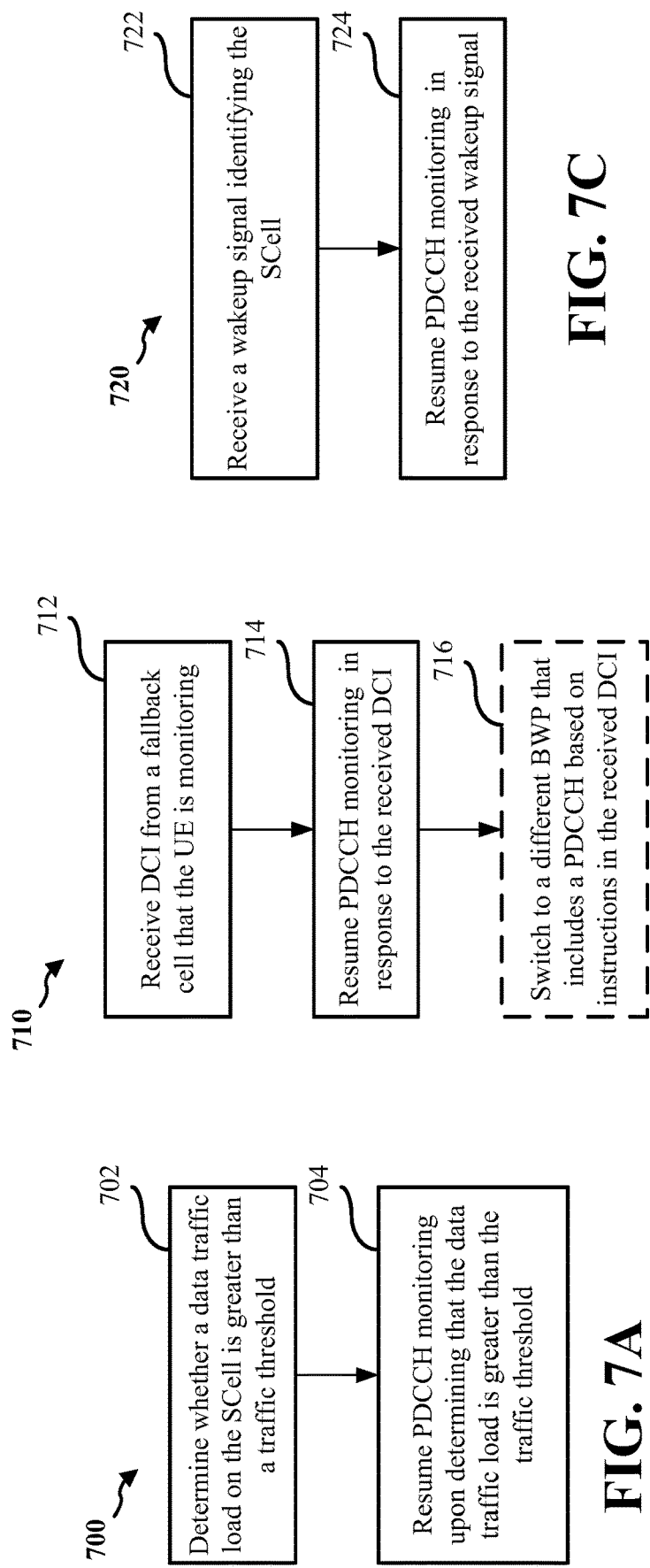

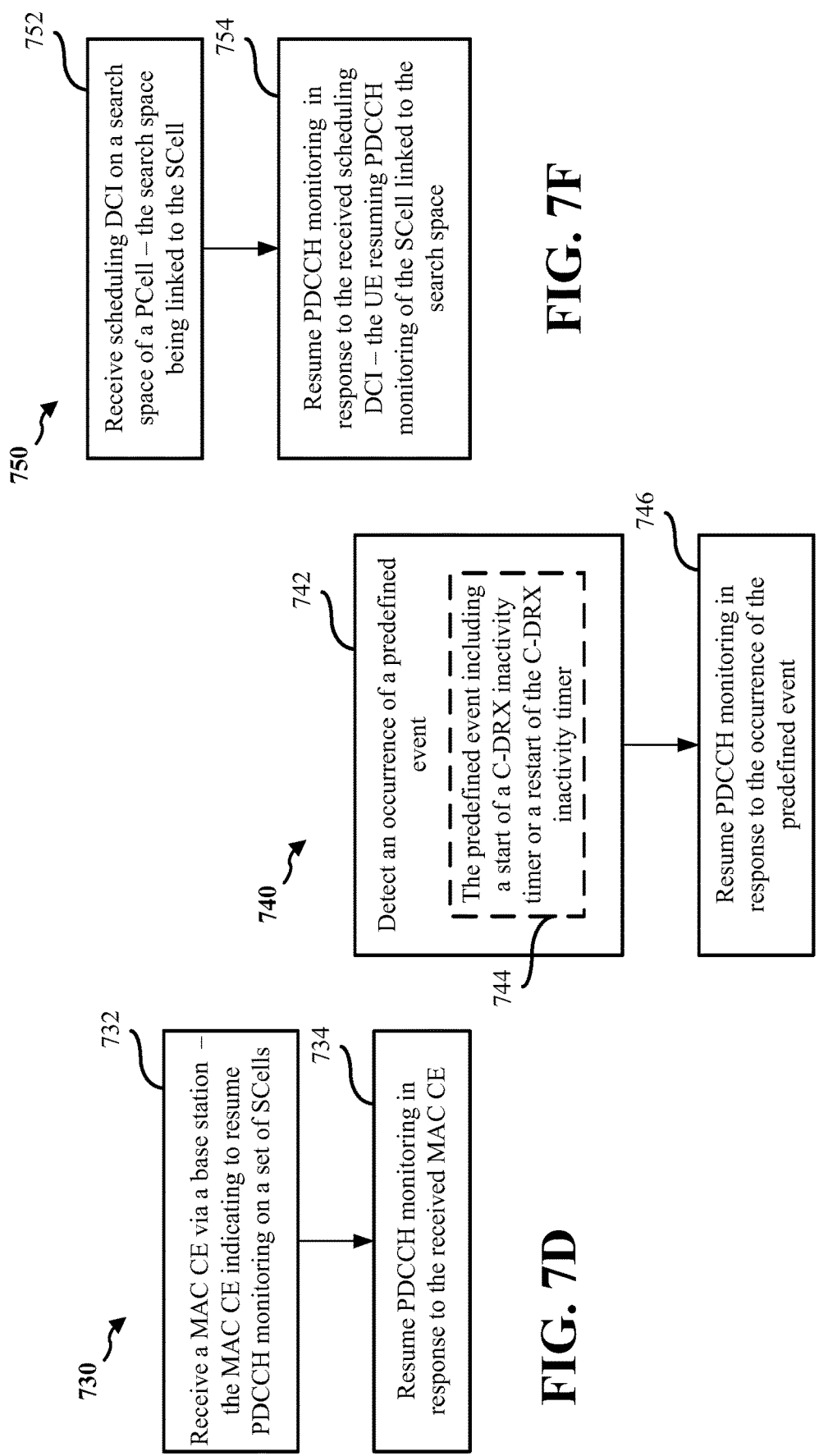

METHODS AND APPARATUS TO FACILITATE PDCCH MONITORING IN CARRIER AGGREGATION FOR LOWER POWER CONSUMPTION

CROSS REFERENCE TO RELATED APPLICATION(S)

This application claims the benefit of U.S. Patent Provisional Application Ser. No. 62/825,738, entitled "METHODS AND APPARATUS TO FACILITATE PDCCH MONITORING IN CARRIER AGGREGATION FOR LOWER POWER CONSUMPTION" and filed on Mar. 28, 2019, which is expressly incorporated by reference herein in its entirety.

BACKGROUND

Technical Field

The present disclosure relates generally to communication systems, and more particularly, to wireless communication including PDCCH monitoring.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

When a user equipment (UE) is configured with carrier aggregation (CA), some secondary cells (SCells) may be configured with their own physical downlink control channel (PDCCH). In some such examples, downlink control information (DCI) for downlink assignments and/or uplink grants on those SCells may be sent in their own PDCCH. These types of SCells may be referred to as "self-scheduling SCells."

In some examples, a UE may monitor PDCCH on a self-scheduling SCell until the self-scheduling SCell is deactivated. Since reactivating a deactivated SCell may incur delays, the network may keep an SCell active until the network determines that there is no more data to communicate in the near future. However, since it may be power intensive for a UE to monitor PDCCH continuously, it may be inefficient for the UE to monitor PDCCH while there is no or little traffic, for example, between data traffic bursts.

Techniques disclosed herein facilitate monitoring PDCCH when needed (e.g., when a traffic load is high). For example, disclosed techniques enable keeping a self-scheduling SCell active, but also enable a UE to stop monitoring PDCCH when there is a period of inactivity in traffic. By keeping the self-scheduling SCell active, techniques disclosed herein may enable reducing UE power consumption and may also enable avoiding latency incurred by re-activating the SCell.

In an aspect of the disclosure, a method, a computer-readable medium, and an apparatus are disclosed. An example apparatus for wireless communication at a user equipment (UE) monitors a physical downlink control channel (PDCCH) on a secondary cell (SCell). The example apparatus stops the PDCCH monitoring on the SCell in response to a monitoring-stoppage event. The example apparatus resumes the PDCCH monitoring on the SCell in response to a monitoring-resumption event. In some examples, the SCell may remain active during a period between the stopping of the PDCCH monitoring and the resuming of the PDCCH monitoring.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIGS. 6A to 6E are flowcharts of wireless communication, including triggering of monitoring-stoppage events, in accordance with the teachings disclosed herein.

FIGS. 7A to 7F are flowcharts of wireless communication, including triggering of monitoring-resumption events, in accordance with the teachings disclosed herein.

DETAILED DESCRIPTION

Figure 1:
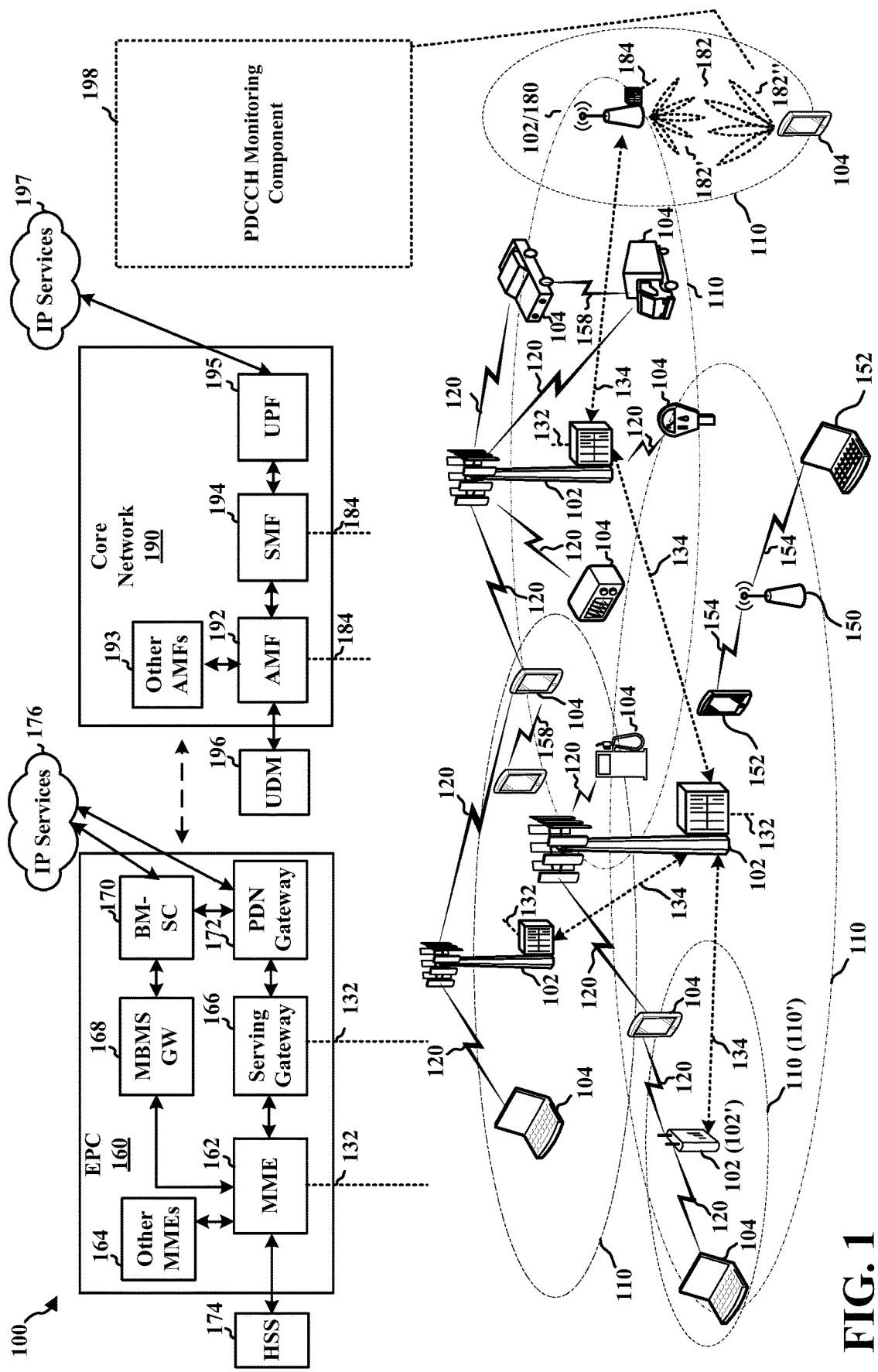
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" may be used interchangeably.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to manage one or more aspects of wireless communication including PDCCH monitoring in carrier aggregation for lower power consumption. For example, the UE 104 of FIG. 1 includes a PDCCH monitoring component 198 configured to monitor a physical downlink control channel (PDCCH) on a secondary cell (SCell). The PDCCH monitoring component 198 may also be configured to stop the PDCCH monitoring on the SCell in response to a monitoring-stoppage event. In some examples, the event may include the reception of a signal. Additionally, the PDCCH monitoring component 198 may be configured to resume the PDCCH monitoring on the SCell in response to a monitoring-resumption event. In some examples, the event may include reception of a signal. In some examples, the SCell remains active during a period between the stopping of the PDCCH monitoring and the resuming of the PDCCH monitoring.

Although the following description provides examples related to 5G/NR, the concepts described herein may be applicable to other similar areas, such as LTE, LTE-A, CDMA, GSM, and/or other wireless technologies, in which a UE monitoring PDCCH on a self-serving SCell may incur power consumption costs and/or in which deactivating and activating of PDCCH monitoring on a self-scheduling SCell may incur long latency costs.

Furthermore, although the following description may be focused on monitoring PDCCH on self-scheduling SCells, the concepts described herein may additionally or alternatively be applicable to other component carriers in a carrier aggregation.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu * 15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/ symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
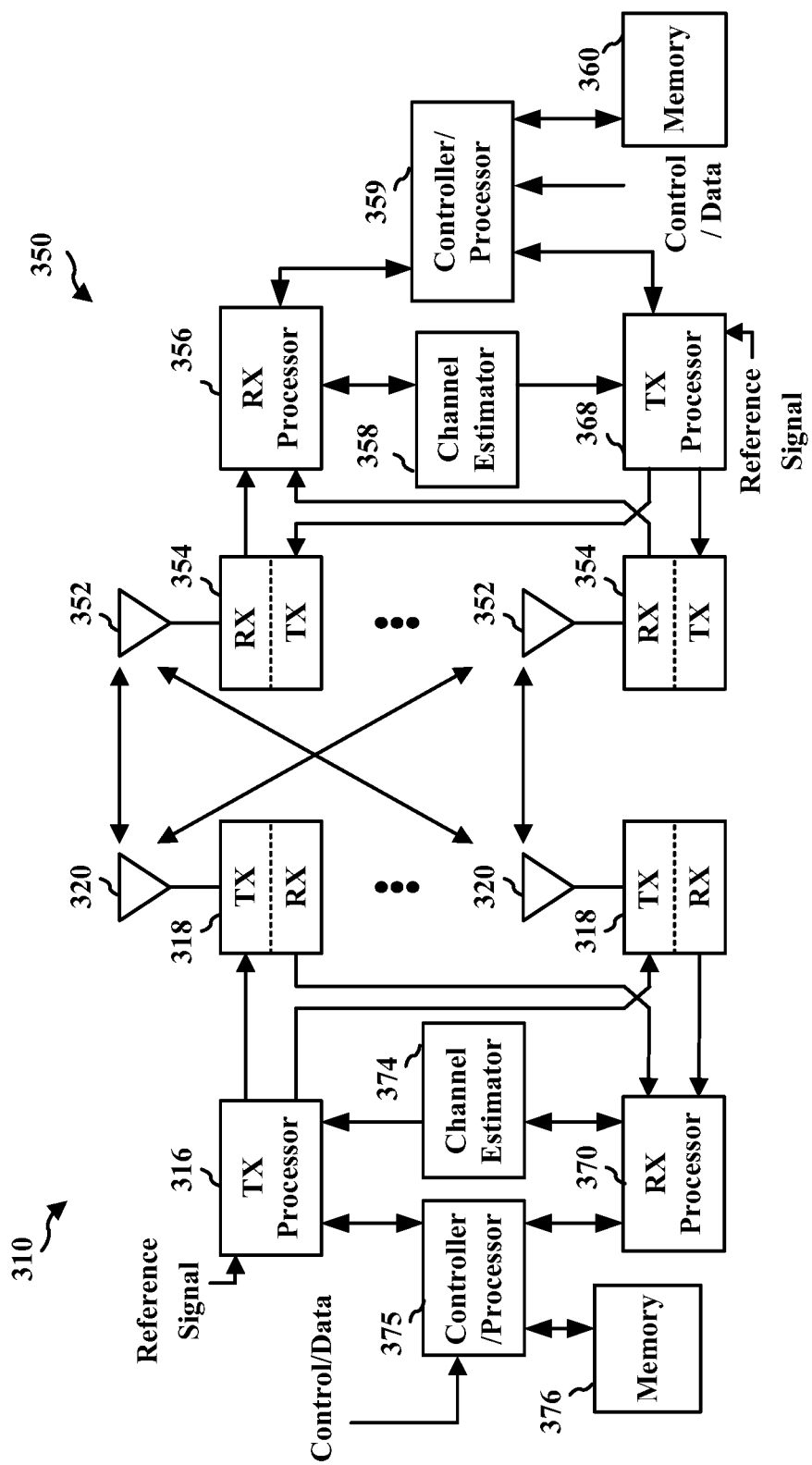
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the PDCCH monitoring component 198 of FIG. 1.

When a user equipment (UE) is configured with carrier aggregation (CA), some secondary cells (SCells) may be configured with their own physical downlink control channel (PDCCH). In some such examples, downlink control information (DCI) for downlink assignments and/or uplink grants on those SCells may be sent in their own PDCCH. These types of SCells may be referred to as "self-scheduling SCells."

In some examples, a UE may monitor PDCCH on a self-scheduling SCell until the self-scheduling SCell is deactivated. In some examples, an SCell may be de-activated by, for example, signaling (e.g., an SCell de-activation MAC-CE) or a timer (e.g., expiration of an SCell de-activation timer). Since reactivating a deactivated SCell may incur delays (sometimes significant delays), the network may keep an SCell active until the network determines that there is no more data to communicate in the near future. However, since it may be power intensive for a UE to monitor PDCCH continuously, it may be inefficient for the UE to monitor PDCCH while there is no or little traffic, for example, between data traffic bursts. Furthermore, in some examples, deactivating and reactivating of the SCell may prompt radio resource control (RRC) reconfiguration of the PDCCH configuration (e.g., by re-designing a search space, configuring a control resource set (CORESET), etc.), which may introduce additional latency and/or that may reduce any power savings that may be experienced by deactivating the SCell.

Techniques disclosed herein facilitate monitoring PDCCH when needed (e.g., when a traffic load is high). For example, disclosed techniques enable keeping a self-scheduling SCell active, but also enable a UE to stop monitoring PDCCH on the self-scheduling SCell when there is a period of inactivity in traffic. By keeping the self-scheduling SCell active, techniques disclosed herein may enable reducing UE power consumption and may also enable avoiding latency incurred by re-activating the SCell. Thus, it may be appreciated that techniques disclosed herein provide a low-latency technique for a UE to stop and restart monitoring PDCCH on a self-scheduling SCell.

Figure 4:
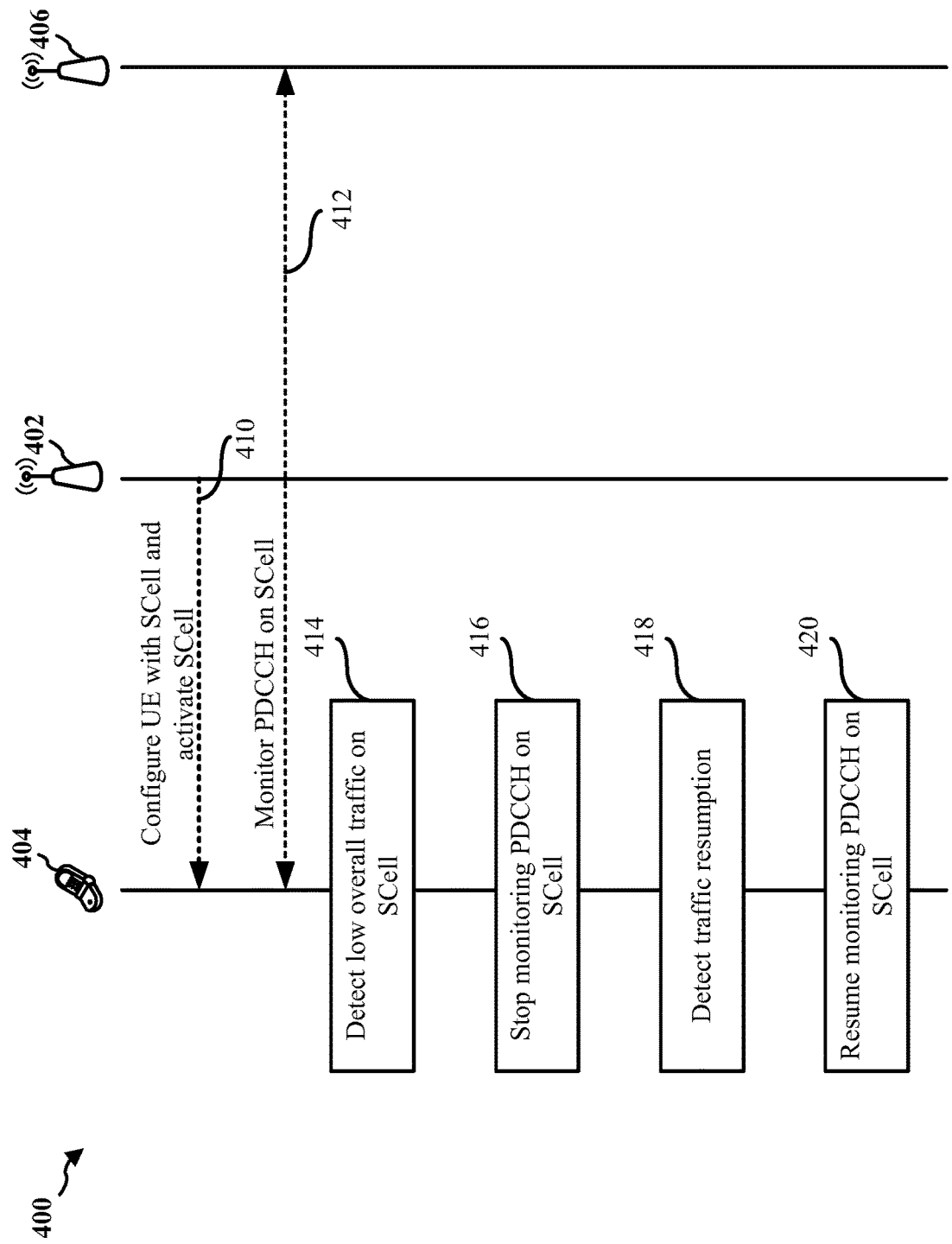
FIG. 4 is an example communication flow between a UE, a base station, and an SCell, in accordance with the teachings disclosed herein.

FIG. 4 illustrates an example of wireless communication 400 between a base station 402, a UE 404, and an SCell 406, as presented herein. In the illustrated example, the SCell 406 is a self-scheduling SCell. One or more aspects of the base station 402 may be implemented by the base station 102 of FIG. 1 and/or the base station 310 of FIG. 3. One or more aspects of the UE 404 may be implemented by the UE 104 of FIG. 1 and/or the UE 350 of FIG. 3. In the illustrated example of FIG. 4 (and as disclosed herein), the UE 404 may stop PDCCH monitoring on the SCell 406 when overall traffic load is low, and may resume PDCCH monitoring on the SCell 406 when traffic resumes.

While the wireless communication 400 includes one base station 402 and one SCell 406 in communication with the UE 404, in additional or alternative examples, the UE 404 may be in communication with any suitable quantity of base stations and/or SCells. For example, the UE 404 may be in communication with zero, one, two, or more base stations and/or the UE 404 may be in communication with zero, one, two, or more SCells (sometimes referred to as a set of SCells). Furthermore, while the wireless communication 400 indicates that the UE 404 stops and resumes PDCCH monitoring on the SCell 406, in additional or alternative examples, the UE 404 may stop PDCCH monitoring on a first SCell (e.g., the SCell 406) based on the occurrence of a monitoring-stoppage event. In some examples, the event may include reception of signaling from a base station. The UE may start (or resume) PDCCH monitoring on a second SCell (e.g., the SCell 406 and/or one or more additional SCells) based on the occurrence of a monitoring-resumption event. In some examples, the even may include reception of signaling from a base station.

The UE 404 may receive a communication 410 from the base station 402 configuring the UE 404 with the SCell 406 and activating the SCell 406. In some examples, the base station 402 may add the SCell 406 to a primary cell (PCell) and/or to a set of SCells via an RRC connection reconfiguration procedure. The UE 404 may then begin monitoring PDCCH 412 on the SCell 406. The UE 404 may detect, at 414, low overall traffic on the SCell 406, and stop monitoring PDCCH on the SCell 406, at 416. In some examples, and as described below, the UE 404 may detect the low overall traffic based on, for example, a timer, network signaling, and/or an occurrence of a predefined event. The UE 404 may then detect, at 418, that traffic resumed, and resume monitoring PDCCH on the SCell 406, at 420. In some examples, and as described below, the UE 404 may detect that traffic resumed based on, for example, network signaling and/or an occurrence of a predefined event.

In some examples, the UE 404 may stop PDCCH monitoring on the SCell 406 based on a timer. For example, the UE 404 may include an SCell inactivity timer (SIT) that is started or restarted by transmission or reception of data on the SCell 406. In some such examples, the UE 404 may stop monitoring PDCCH on the SCell 406 in response to the SCell inactivity timer expiring. In some examples, the UE 404 may retain the current (or active) bandwidth part (BWP) associated with the SCell, but may stop monitoring PDCCH on that SCell. In some examples, the UE 404 may switch from an active BWP to a different BWP that does not contain PDCCH. In some such examples, the UE 404 may autonomously switch from the active BWP to the different BWP. For example, the UE 404 may switch form the active BWP to the different BWP without receiving signaling (e.g., from the base station 402 and/or the SCell 406).

In some examples, the UE 404 may stop PDCCH monitoring on the SCell 406 based on a signal received from the network. For example, the UE 404 may receive downlink control information (DCI) from the base station 402. In some examples, the DCI received from the base station 402 may be similar to DCI used for de-activating a type-2 uplink configured grant and/or may be similar to DCI used for de-activating type-2 downlink semi-persistent scheduling (SPS). In some examples, the DCI received from the base station 402 may be scheduling DCI that may cause the UE 404 to switch from an active BWP to a different BWP (e.g., perform a BWP switch) that does not contain PDCCH.

In some examples, the signal (or signaling) received from the network may be a medium access control-control element (MAC-CE). In some such examples, the MAC-CE may indicate a particular SCell and/or a set of SCells f that the UE 404 is to stop PDCCH monitoring.

In some examples, the occurrence of a predefined event may trigger the UE 404 to stop PDCCH monitoring on the SCell 406. For example, the UE 404 may be configured with connected mode discontinuous reception (C-DRX). In some such examples, the base station 402 may configure the UE 404 with C-DRX parameters. For example, the C-DRX parameters may include a set of SCells for which the UE is to perform PDCCH monitoring. In some such examples, the C-DRX parameters may additionally or alternatively identify a subset of SCells of the set of SCells for which the UE 404 is to stop PDCCH monitoring at the start of a C-DRX ON duration. The subset of SCells may include any suitable quantity of SCells of the set of SCells including, for example, zero SCells of the set of SCells to all of the SCells of the set of SCells. In some examples, the subset of SCells may include a quantity of SCells and/or may include identifiers for particular SCells (e.g., of the set of SCells).

Thus, as described above, in some examples, the UE 404 may stop PDCCH monitoring on the SCell 406 while keeping the SCell active (e.g., without de-activating the SCell 406).

In some examples, and as described above at 420, the UE 404 may resume PDCCH monitoring on the SCell. For example, the UE 404 may resume PDCCH monitoring on a first SCell (e.g., the SCell 406). In other examples, the UE 404 may additionally or alternatively resume (or start) PDCCH monitoring on a second SCell different than the first SCell, may resume (or start) PDCCH monitoring on a set of SCells including the first SCell, and/or may resume (or start) PDCCH monitoring on a set of SCells that does not include the first SCell. The UE 404 may resume (or start) PDCCH monitoring on the SCell based on network signaling and/or an occurrence of a predefined event.

In some examples, the UE 404 may resume PDCCH monitoring on the SCell 406 (at 420) based on network signaling received from the network. For example, the UE 404 may receive DCI from the base station 402. In some examples, the UE 404 may be capable of cross-carrier signaling that enables the UE 404 to connect to different cells to receive PDCCH on different carriers. In some such examples, the DCI received from the base station 402 may be received from a fallback cell for which the UE 404 is still performing PDCCH monitoring. For example, after the UE 404 stops PDCCH monitoring on a first SCell (e.g., at 416), the UE 404 may receive DCI for the first SCell from the fallback cell. In some examples, the fallback cell may be a designated (or pre-configured) SCell that the UE 404 is monitoring. In some examples, the fallback cell may be a primary cell (PCell).

In some examples, the DCI received from base station 402 may be similar to DCI used for activating a type-2 uplink configured grant and/or may be similar to DCI used for activating type-2 downlink semi-persistent scheduling (SPS). In some examples, the DCI received from the base station 402 may be scheduling DCI that may cause the UE 404 to switch from an active BWP to a different BWP (e.g., perform a BWP switch) that contains PDCCH.

In some examples, the signal received from the network may be a medium access control (MAC) control element (CE). In some such examples, the MAC-CE may indicate a particular SCell and/or a set of SCells for which the UE 404 is to resume (or start) PDCCH monitoring.

In some examples, the signal received from the network may be a wakeup signal (WUS). For example, the UE 404 may be configured with connected mode discontinuous reception (C-DRX) and the base station 402 may configure the UE 404 with C-DRX parameters including a set of SCells. In some such examples, the base station 402 may transmit a WUS to the UE 404 (e.g., at the start of a C-DRX ON duration) indicating a subset of SCells of the set of SCells for which the UE 404 is to resume (or start) PDCCH monitoring.

In some examples, the occurrence of a predefined event may trigger the UE 404 to resume PDCCH monitoring on an SCell. In some such examples, the predefined event may be associated with C-DRX states. For example, when a C-DRX inactivity timer is started or restarted (e.g., upon receipt of PDCCH for transmission of data or receipt of data), the UE 404 may resume (or start) PDCCH monitoring on a subset of SCells of the set of SCells. In some such examples, the base station 402 may configure the UE 404 with C-DRX parameters including the subset of SCells of the set of SCells to monitor during respective C-DRX states.

In some examples, the subset of SCells (e.g., of the WUS and/or the C-DRX parameters) may include any suitable quantity of SCells of the set of SCells including, for example, zero SCells of the set of SCells to all of the SCells of the set of SCells. In some examples, the subset of SCells may include a quantity of SCells and/or may include identifiers for particular SCells (e.g., of the set of SCells).

In some examples, the UE 404 may resume (or start) PDCCH monitoring on an SCell based on DCI and a linkage (e.g., an implied linkage) between a search space of a PCell and a set of SCells. For example, the network may designate a search space associated with a PCell and also link a set of SCells to the designated search space. In some such examples, scheduling DCI received in the designated search space may cause the UE 404 to resume PDCCH monitoring on the linked set of SCells.

As an illustrative example, consider an example in which the UE receives DCI in a first search space on a PCell on PDCCH and that the first search space is linked to a first SCell. It may be appreciated that the UE has at least one search space in a PDCCH. In some such examples, if the UE receives scheduling DCI in the first search space on the PCell, then the UE may resume monitoring PDCCH on the first SCell. In some examples, if the UE has previously stopped monitoring PDCCH on the first SCell (e.g., in response to a monitoring-stoppage event), then the UE may continue not monitoring PDCCH on the first SCell as long as the UE does not receive DCI in the first search space on the PCell. In some examples, the event may be based on an indication or signal received from the base station. In some examples, the linkage between the search space and the SCell may be a many-to-one linkage. For example, a set of SCells may be linked to a same search space on a PCell. The set of SCells may include any appropriate quantity of SCells, including, for example, one SCell, two SCells, etc.

Thus, as described above, in some examples, the UE 404 may resume PDCCH monitoring on an SCell after stopping the PDCCH monitoring on the SCell. In some such examples, because the SCell is still active when the UE 404 stops the PDCCH monitoring on the SCell, the UE 404 may resume the PDCCH monitoring relatively quickly (e.g., as compared to performing an RRC connection reconfiguration procedure to activate the SCell). Thus, the techniques disclosed herein facilitate low-latency (e.g., relatively fast) stopping and resuming of PDCCH monitoring of one or more SCells.

Figure 5:
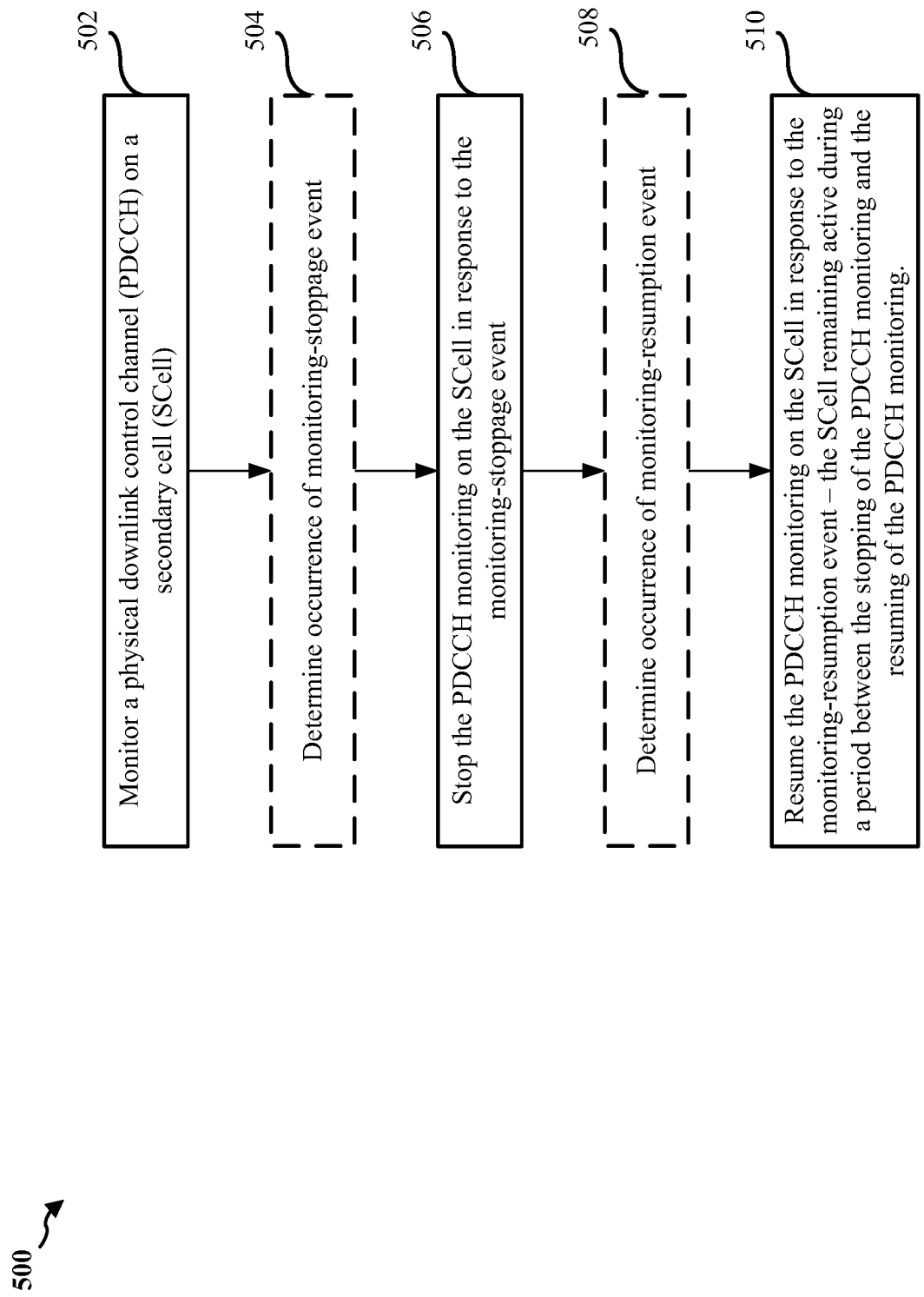
FIG. 5 is a flowchart of wireless communication, in accordance with the teachings disclosed herein.

FIG. 5 is a flowchart 500 of a method of wireless communication. The method may be performed by a UE or a component of a UE (e.g., the UE 104 of FIG. 1, the UE 350 of FIG. 3, the UE 404 of FIG. 4, the apparatus 802/802' of FIGS. 8 and 9, respectively; the processing system 914, which may include the memory 360 of FIG. 3 and which may be the entire UE 350, or a component of the UE 350, such as the TX processor 368, the RX processor 356, and/or the controller/processor 359). The method may enable a UE or other wireless device to reduce power consumption during PDCCH monitoring and/or perform low-latency stopping and resuming of PDDCH monitoring. Optional aspects are illustrated with a dashed line.

At 502, the UE monitors a PDCCH on a SCell, as described in connection with, for example, monitoring PDCCH 412 on the SCell 406 of FIG. 4. For example, a traffic monitoring component 806 may facilitate the monitoring of PDCCH on an SCell. The SCell may be an active SCell associated with a base station and in communication with the UE.

As illustrated at 504, the UE may determine an occurrence of a monitoring-stoppage event. For example, the traffic monitoring component 806, the timer component 808, the DCI handling component 810, the MAC-CE handling component 814, and/or the C-DRX handling component 816 may facilitate the determination that the monitoring-stoppage signaling has occurred. As described above in connection with the wireless communication 400 of FIG. 4, and as described below in connection with the flowcharts of FIGS. 6A to 6E, the monitoring-stoppage event may include, for example, expiration of a timer (e.g., an SCell inactivity timer), reception of signaling from a base station (e.g., a received DCI and/or a received MAC-CE), and/or the occurrence of a predefined event (e.g., the start of a C-DRX ON duration).

As illustrated at 506, the UE stops the PDCCH monitoring on the SCell in response to the monitoring-stoppage event, as described in connection with, for example, 416 of FIG. 4. For example, the stop monitoring component 818 may facilitate the stopping of the PDCCH monitoring on the SCell. In some examples, the UE stops the PDCCH monitoring on the SCell while the SCell remains active. As illustrated at 416 in FIG. 4, the UE may stop the PDCCH monitoring on the SCell. By stopping the performing of the PDCCH monitoring on the SCell if the monitoring-stoppage event occurs, the UE may conserve power by not continuously monitoring PDCCH on the SCell while there is no or limited traffic on the SCell.

As illustrated at 508, the UE may determine that a monitoring-resumption event has occurred. For example, the traffic monitoring component 806, the timer component 808, the DCI handling component 810, the MAC-CE handling component 814, and/or the C-DRX handling component 816 may determine the occurrence of the PDCCH monitoring-resumption. As described above in connection with the wireless communication 400 of FIG. 4, and as described below in connection with the flowcharts of FIGS. 7A to 7F, the monitoring-resumption event may include network signaling (e.g., a received DCI, a received wakeup signal, a received MAC-CE, and/or a received scheduling DCI) and/or the occurrence of a predefined event (e.g., the starting or restarting of a C-DRX inactivity timer).

As illustrated at 510, the UE resumes the PDCCH monitoring on the SCell in response to the monitoring-resumption event, as described in connection with, for example, 420 of FIG. 4. For example, the resume monitoring component 820 may facilitate the resuming of the PDCCH monitoring on the SCell. In some examples, the UE resumes the PDCCH monitoring on the SCell while the SCell remains active. In some such examples, the UE may not incur latency costs by waiting to re-active the SCell before resuming PDCCH monitoring on the SCell. As illustrated at 420 in FIG. 4, the UE may resume the PDCCH monitoring on the SCell.

In some examples, the SCell remains active during a period between stopping the PDCCH monitoring and resuming the PDCCH monitoring. For example, the UE may stop the PDCCH monitoring on the SCell at a first time, and the UE may resume the PDCCH monitoring on the SCell at a second time. In some such examples, the SCell may remain active during the time between the first time and the second time.

By keeping the SCell active between the first time and the second time, the UE may be able to reduce latency associated with transitioning from not performing PDCCH monitoring on the SCell to performing PDCCH monitoring on the SCell. Furthermore, by stopping the PDCCH monitoring on the SCell during, for example, periods of relatively low data traffic loads, the UE may be able to conserve power.

FIGS. 6A to 6E illustrate example techniques for determining a monitoring-stoppage event has occurred, as disclosed herein. For example, one or more of the example techniques of FIGS. 6A to 6E may be used to determine the occurrence of the monitoring-stoppage event at 504 and to stop the PDCCH monitoring at 506 of FIG. 5. The example techniques may enable a UE or other wireless device to reduce power consumption during PDCCH monitoring by stopping the performing of PDCCH monitoring on the SCell. Optional aspects are illustrated with a dashed line.

FIG. 6A is a flowchart 600 of an example method of determining an occurrence of the monitoring-stoppage event based on a minimum traffic threshold. For example, at 602, the UE may determine whether a data traffic load on the SCell satisfies a minimum traffic threshold (e.g., the data traffic load on the SCell is greater than the minimum traffic threshold), as described in connection with, for example, 414 of FIG. 4. For example, the traffic monitoring component 806 may facilitate determining whether the data traffic load on the SCell satisfies the minimum traffic threshold. At 604, the UE stops PDCCH monitoring on the SCell when the data traffic load on the SCell fails to satisfy the minimum traffic threshold, as described in connection with, for example, 414 of FIG. 4. For example, traffic monitoring component 806 may determine the occurrence of the monitoring-stoppage event and may trigger the stopping of the PDCCH monitoring. For example, the minimum traffic threshold may correspond to a quantity of traffic indicative of data transfer. In some such examples, when the data traffic load on the SCell fails to satisfy the minimum traffic threshold (e.g., the data traffic load on the SCell is less than the minimum traffic threshold), the UE may operate as if little or no traffic is being transmitted or received on the SCell and, thus, may initiate the stopping the PDCCH monitoring on the SCell.

Although not shown in FIG. 6A, when the data traffic load on the SCell satisfies the minimum traffic threshold (e.g., the data traffic load on the SCell is greater than or equal to the minimum traffic threshold), the UE continues PDCCH monitoring on the SCell.

FIG. 6B is a flowchart 610 of an example method of determining the monitoring-stoppage event based on a timer. For example, at 612, the UE may start or restart a timer (e.g., the SCell inactivity timer) in response to transmission of a subsequent (or new) physical uplink shared channel (PUSCH) on the SCell or reception of a subsequent (or new) physical downlink shared channel (PDSCH) on the SCell. For example, the timer component 808 may facilitate the starting or restarting of a timer. In some examples, the UE may initiate a different SCell inactivity timer for each active SCell in communication with the UE. At 614, the UE may stop the PDCCH monitoring on the SCell when an SCell inactivity timer expires. For example, the timer component 808 may determine the occurrence of the monitoring-stoppage event when the SCell inactivity timer expires and may trigger the stopping of the PDCCH monitoring. In some such examples, the UE may determine, based on the SCell inactivity timer expiring, that the traffic load on the corresponding SCell is relatively low and, thus, may initiate the stopping of PDCCH monitoring on the corresponding SCell.

In some examples, at 616, the UE may maintain an active bandwidth part (BWP), but may stop PDCCH monitoring on the SCell. For example, the stop-monitoring component 818 may be configured to maintain an active BWP while stopping PDCCH monitoring on the SCell. For example, the UE may be configured with one or more bandwidth parts, but at any one time, the UE may operate using one BWP (sometimes referred to as an "active bandwidth part"). In some such examples, the UE may maintain (or retain) the active BWP while stopping PDCCH monitoring on the SCell.

In some examples, at 618, the UE may switch to a different BWP that does not include a PDCCH. For example, the stop monitoring component 818 may perform the switch to the different BWP that does not include PDCCH. For example, the UE may switch (e.g., autonomously switch) from the active BWP to a different BWP (e.g., by performing a BWP switch) that does not include a PDCCH.

FIG. 6C is a flowchart 620 of an example method of determining an occurrence of the monitoring-stoppage event based on network signaling. For example, at 622, the UE receives DCI from a base station. For example, the DCI handling component 810 may receive the DCI. In some examples, the base station may be associated with the SCell. In some examples, the received DCI may be similar to the DCI used to de-activate type-2 uplink configured grants and/or may be similar to the DCI used to de-activate type-2 downlink semi-persistent scheduling (SPS). In some examples, the received DCI may be a scheduling DCI. At 624, the UE stops the PDCCH monitoring on the SCell in response to the received DCI. For example, the DCI handling component 810 may determine the occurrence of the monitoring-stoppage event and may trigger the stopping of the PDCCH monitoring. At 626, the UE may switch from an active BWP to a different BWP that does not include a PDCCH based on instructions in the received DCI. For example, the stop monitoring component 818 may perform the switch from the active BWP to a different BWP. For example, the scheduling DCI may include instructions that cause the UE to perform a BWP switch to switch from the active BWP to the different BWP. In some examples, the UE may perform the BWP switch based on a change in traffic load of the UE.

FIG. 6D is a flowchart 630 of another example method of determining an occurrence of the monitoring-stoppage signaling based on network signaling. For example, at 632, the UE receives a MAC-CE from a base station. For example, the MAC-CE handling component 814 may facilitate the receiving of the MAC-CE. In some examples, the base station may be associated with the SCell. In some examples, the received MAC-CE may indicate to the UE to stop PDCCH monitoring on one or more SCells. At 634, the UE may determine the occurrence of the monitoring-stoppage based on reception of the MAC-CE, and may stop the PDCCH monitoring SCell in response to receiving the MAC-CE. For example, the MAC-CE handling component 814 may be configured to determine the occurrence of the monitoring-stoppage and to stop the PDCCH monitoring on the SCell in response to the received MAC-CE. For example, the UE may stop PDCCH monitoring on the one or more SCells indicated in the MAC-CE.

FIG. 6E is a flowchart 640 of an example method of triggering the monitoring-stoppage event based on a pre-defined event. For example, at 642, the UE may detect an occurrence of a predefined event. For example, the C-DRX handling component 816 may detect the occurrence of the predefined event. In some examples, the UE may be configured with connected mode discontinuous reception (C-DRX). In some such examples, at 644, the predefined event may be the start of a C-DRX ON duration. For example, the C-DRX handling component 816 may detect the start of the C-DRX ON duration. At 646, the UE may determine the occurrence of the monitoring-stoppage signaling based on the occurrence of the predefined event. For example, the C-DRX handling component 816 may determine the occurrence of the monitoring-stoppage event and may trigger the stopping of the PDCCH monitoring on the SCell. For example, the UE may stop PDCCH monitoring on one or more SCells at the start of C-DRX ON duration.

FIGS. 7A to 7F illustrate example techniques for determining an occurrence of a monitoring-resumption event, as disclosed herein. For example, one or more of the example techniques of FIGS. 7A to 7F may be used to implement the determine the occurrence of the monitoring-resumption event at 508 and to resume PDCCH monitoring at 510 of FIG. 5. The example techniques may enable a UE or other wireless device to reduce latency when transitions from not performing PDCCH monitoring to performing PDCCH monitoring. Optional aspects are illustrated with a dashed line.

FIG. 7A is a flowchart 700 of an example method of determining an occurrence of the monitoring-resumption event based on a traffic threshold. For example, at 702, the UE may determine whether a data traffic load on the SCell is greater than a traffic threshold. For example, the traffic monitoring component 806 may facilitate the determining of whether the data traffic load on the SCell is greater than the traffic threshold. At 704, the UE may resume PDCCH monitoring on the SCell when the data traffic load on the SCell is greater than the traffic threshold. For example, the traffic monitoring component 806 may determine an occurrence of the monitoring-resumption event and may trigger resumption of the PDCCH monitoring on the SCell. For example, the traffic threshold may correspond to a quantity of traffic indicative of data transfer. In some such examples, when the data traffic load on the SCell is greater than the traffic threshold, the UE may operate as if traffic has resumed on the SCell and, thus, may resuming the PDCCH monitoring on the SCell.

Although not shown in FIG. 7A, in some examples, when the data traffic load on the SCell is not greater than the traffic threshold, the UE may continue not performing PDCCH monitoring on the SCell.

FIG. 7B is a flowchart 710 of an example method of determining an occurrence of the monitoring-resumption event based on network signaling. In some examples, the UE may be capable of performing cross-carrier signaling. In some such examples, the network may transmit a DCI to the UE. For example, at 712, the UE may receive a DCI from a fallback cell that the UE is monitoring. For example, the DCI handling component 810 may receive the DCI. In some such examples, the base station may transmit the DCI to the UE via the fallback cell. For example, after the UE stops PDCCH monitoring on a first SCell, the UE may receive DCIs for the first SCell via a fallback cell. In some such examples, the fallback cell may be a designated (or preconfigured) SCell for which the UE is still performing PDCCH monitoring. In some examples the fallback cell may be a primary cell (PCell).

In some examples, the received DCI may be similar to the DCI used to activate type-2 uplink configured grants and/or may be similar to the DCI used to activate type-2 downlink semi-persistent scheduling (SPS). In some examples, the received DCI may be a scheduling DCI. At 714, the UE resumes the PDCCH monitoring on the SCell in response to the received DCI. For example, the DCI handling component 810 may determine the occurrence of the monitoring-resumption event and may trigger resumption of the PDCCH monitoring on the SCell. At 716, the UE may switch from an active BWP to a different BWP that includes a PDCCH based on instructions in the received DCI. For example, the resume monitoring component 820 switch from the active BWP to the different BWP. For example, the scheduling DCI may include instructions that cause the UE to switch to the different BWP.

FIG. 7C is a flowchart 720 of another example method of determining an occurrence of the monitoring-resumption event based on network signaling. In some examples, the UE may be configured with C-DRX. In some such examples, at 722, the UE may receive a wakeup signal identifying the SCell. For example, the C-DRX handling component 816 may receive the wakeup signal. For example, at the start of a C-DRX ON duration, the base station may transmit a wakeup signal instructing the UE which one or more SCells the UE is to perform PDCCH monitoring. At 724, the UE may resume the PDCCH monitoring on the SCell in response to the received wakeup signal. For example, the C-DRX handling component 816 may determine the occurrence of the monitoring-resumption event and may trigger resumption of the PDCCH monitoring on the SCell. For example, the UE may resume PDCCH monitoring on one or more SCells identified via the wakeup signal.

FIG. 7D is a flowchart 730 of another example method of determining an occurrence of the monitoring-resumption event based on network signaling. For example, at 732, the UE receives a MAC-CE from a base station. For example, the MAC-CE handling component 814 may receive the MAC-CE. In some examples, the base station may be associated with the SCell. In some examples, the received MAC-CE may indicate to the UE one or more SCells for which the UE is to resume PDCCH monitoring. At 734, the UE may resume the PDCCH monitoring on the SCell in response to the received MAC-CE. For example, the MAC-CE handling component 814 may determine the occurrence of the monitoring-resumption event and may trigger resumption of the PDCCH monitoring on the SCell. For example, the UE may resume PDCCH monitoring on the one or more SCells indicated in the MAC-CE.

FIG. 7E is a flowchart 740 of an example method of determining an occurrence of the monitoring-resumption event based on a predefined event. For example, at 742, the UE may detect an occurrence of a predefined event. In some examples, the UE may be configured with C-DRX. In some such examples, at 744, the predefined event may include the start of the C-DRX inactivity timer or may include the restart of the C-DRX inactivity timer. For example, the C-DRX handling component 816 may detect the occurrence of the predefined event. At 746, the UE may resume the PDCCH monitoring in response to the occurrence of the predefined event. For example, the C-DRX handling component 816 trigger a resumption of the PDCCH monitoring when the event is determined to have occurred. For example, the UE may resume PDCCH monitoring on one or more SCells at the start (or restart) of the C-DRX inactivity timer.

FIG. 7F is a flowchart 750 of another example method of determining an occurrence of the monitoring-resumption event based on network signaling. For example, at 752, the UE receives a scheduling DCI on a search space of a PCell. For example, the DCI handling component 810 may receive the scheduling DCI. In some examples, the search space is linked to one or more SCells. At 754, the UE may resume the PDCCH monitoring on the SCell in response to receiving scheduling DCI. For example, the DCI handling component 810 may determine an occurrence of the monitoring-resumption event and trigger resumption of the PDCCH monitoring on the SCell. In some examples, the UE may resume PDCCH monitoring on the one or more SCells linked to the search space. In some examples, the UE may resume the PDCCH monitoring based on instructions in the scheduling DCI.

Figure 8:
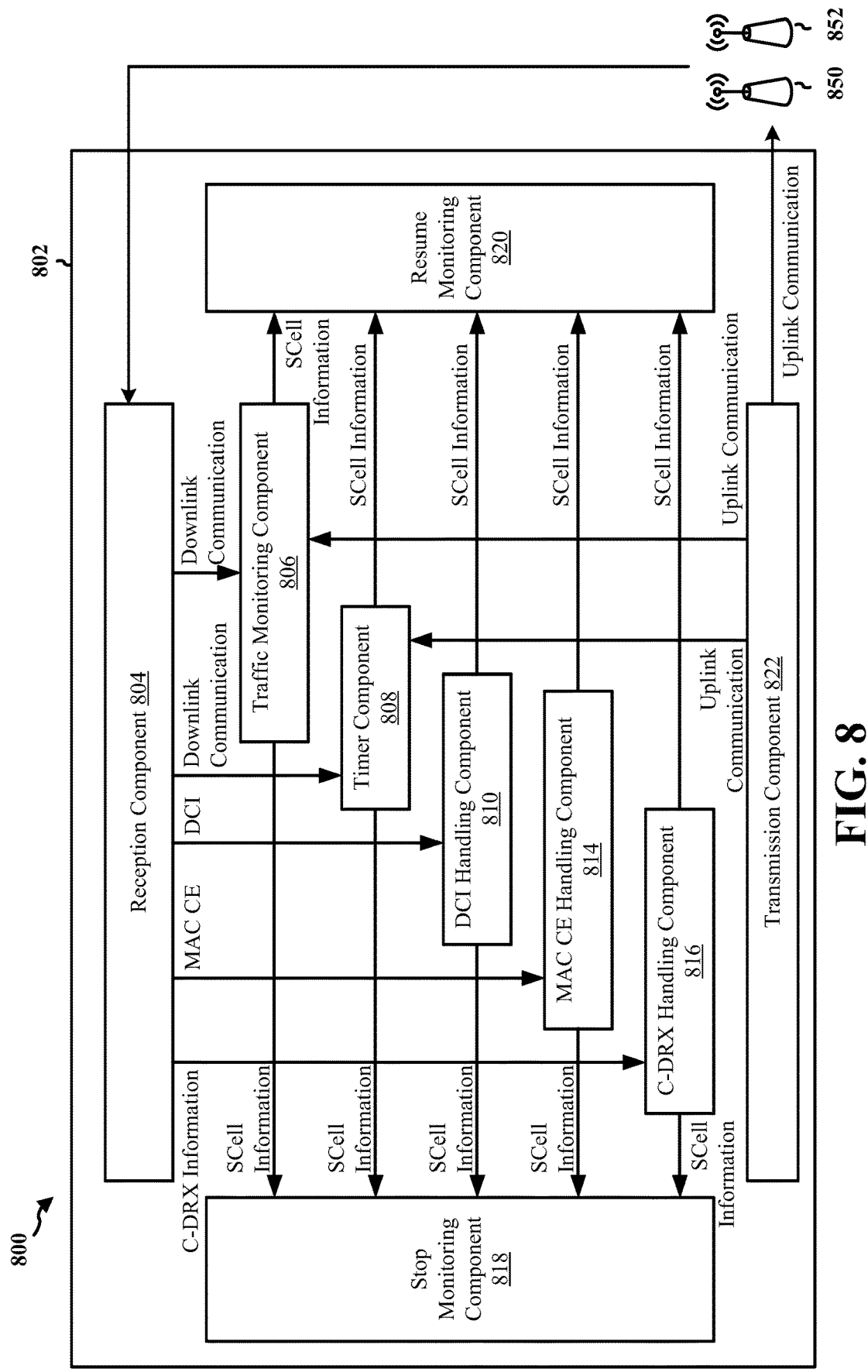
FIG. 8 is a conceptual data flow diagram illustrating the data flow between different means/components in an example apparatus.

FIG. 8 is a conceptual data flow diagram 800 illustrating the data flow between different means/components in an example apparatus 802. The apparatus 802 may be a UE or a component of the UE. In the illustrated example, the apparatus 802 includes a reception component 804, a traffic monitoring component 806, a timer component 808, a DCI handling component 810, a MAC-CE handling component 814, a C-DRX handling component 816, a stop monitoring component 818, a resume monitoring component 820, and a transmission component 822.

The reception component 804 may be configured to receive various types of signals/messages and/or other information from other devices, including, for example, a base station 850 and/or a SCell 852. The messages/information may be received via the reception component 804 and provided to one or more component of the apparatus 802 for further processing and/or use in performing various operations. For example, the reception component 804 may be configured to receive PDCCH, PDSCH, a wakeup signal, a MAC-CE, and/or DCI from the base station 850 and/or the SCell 852.

The traffic monitoring component 806 may be configured to determine whether a data traffic load on the SCell satisfies a minimum traffic threshold (e.g., as described in connection with 602 of FIG. 6A), may be configured to determine whether a monitoring-stopping event has occurred and stop the PDCCH monitoring on the SCell based on the data traffic load (e.g., as described in connection with 604 of FIG. 6A), may be configured to determine whether a data traffic load on the SCell is greater than a traffic threshold (e.g., as described in connection with 702 of FIG. 7A), and/or may be configured to stop the PDCCH monitoring on the SCell based on the determination (e.g., as described in connection with 704 of FIG. 7A).

The timer component 808 may be configured to start or restart a timer (e.g., an SCell inactivity timer) in response to transmission of subsequent (or new) PUSCH and/or in response to reception of subsequent (or new) PDSCH on the SCell (e.g., as described in connection with 612 of FIG. 6B) and/or may be configured to determine that a monitoring-stopping event has occurred and stop the PDCCH monitoring on the SCell when the timer expires (e.g., as described in connection with 614 of FIG. 6B).

The DCI handling component 810 may be configured to receive DCI from a base station (e.g., as described in connection with 622 of FIG. 6C), may be configured to determine that a monitoring-stopping event has occurred and stop the PDCCH monitoring on the SCell in response to the received DCI (e.g., as described in connection with 624 of FIG. 6C), may be configured to receive DCI from a fallback cell that the apparatus is monitoring (e.g., as described in connection with 712 of FIG. 7B), may be configured to determine that a monitoring-resumption event has occurred and resume the PDCCH monitoring on the SCell in response to the received DCI (e.g., as described in connection with 714 of FIG. 7B), may be configured to receive scheduling DCI on a search space of a PCell (e.g., as described in connection with 752 of FIG. 7F), and/or may be configured to determine that a monitoring-resumption event has occurred and resume the PDCCH monitoring on the SCell in response to the received scheduling DCI (e.g., as described in connection with 754 of FIG. 7F).

The MAC-CE handling component 814 may be configured to receive a MAC-CE from a base station (e.g., as described in connection with 632 of FIG. 6D), may be configured to determine that a monitoring-resumption event has occurred and resume the PDCCH monitoring on the SCell in response to the received MAC-CE (e.g., as described in connection with 634 of FIG. 6D), may be configured to receive a MAC-CE from a base station (e.g., as described in connection with 732 of FIG. 7D), and/or may be configured to determine that a monitoring-resumption event has occurred and resume the PDCCH monitoring on the SCell in response to the received MAC-CE (e.g., as described in connection with 734 of FIG. 7D).

The C-DRX handling component 816 may be configured to detect the occurrence of a predefined event, such as the start of a C-DRX cycle (e.g., as described in connection with 642 and 644 of FIG. 6E), may be configured to trigger the monitoring-stoppage signaling in response to the occurrence of a predefined event (e.g., as described in connection with 646 of FIG. 6E), may be configured to receive a wakeup signal identifying one or more SCells (e.g., as described in connection with 722 of FIG. 7C), may be configured to determine that a monitoring-resumption event has occurred and resume the PDCCH monitoring on the SCell in response to the received wakeup signal (e.g., as described in connection with 724 of FIG. 7C), may be configured to detect the occurrence of a predefined event, such as the start of a C-DRX inactivity timer or a restart of the C-DRX inactivity timer (e.g., as described in connection with 742 and 744 of FIG. 7E), and/or may be configured to determine that a monitoring-resumption event has occurred and resume the PDCCH monitoring on the SCell in response to the occurrence of the predefined event (e.g., as described in connection with 746 of FIG. 7E).

The stop monitoring component 818 may be configured to stop PDCCH monitoring on one or more SCells in response to a monitoring-stoppage event (e.g., as described in connection with 506 of FIG. 5), may be configured to stop the PDCCH monitoring on the one or more SCells while maintaining the active BWP (e.g., as described in connection with 616 of FIG. 6B), may be configured to stop the PDCCH monitoring on the one or more SCells by switching from an active BWP to a different BWP that does not include a PDCCH (e.g., as described in connection with 618 of FIG. 6B), and/or may be configured to stop the PDCCH monitoring on the one or more SCells by switching from an active BWP to a different BWP that does not include a PDCCH based on instructions in received DCI (e.g., as described in connection with 626 of FIG. 6C).

The resume monitoring component 820 may be configured to resume PDCCH monitoring on one or more SCells in response to a monitoring-resumption event (e.g., as described in connection with 510 of FIG. 5), and/or may be configured to resume the PDCCH monitoring on the one or more SCells by switching from an active BWP to a different BWP that includes a PDCCH based on instructions in received DCI (e.g., as described in connection with 716 of FIG. 7B).

The transmission component 822 may be configured to transmit various types of signals/messages and/or other information to other devices, including, for example, the base station 850 and/or the SCell 852.

The apparatus may include additional components that perform each of the blocks of the algorithm in the aforementioned flowcharts of FIGS. 5, 6A to 6E, and/or 7A to 7F. As such, each block in the aforementioned flowcharts of FIGS. 5, 6A to 6E, and/or 7A to 7F may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
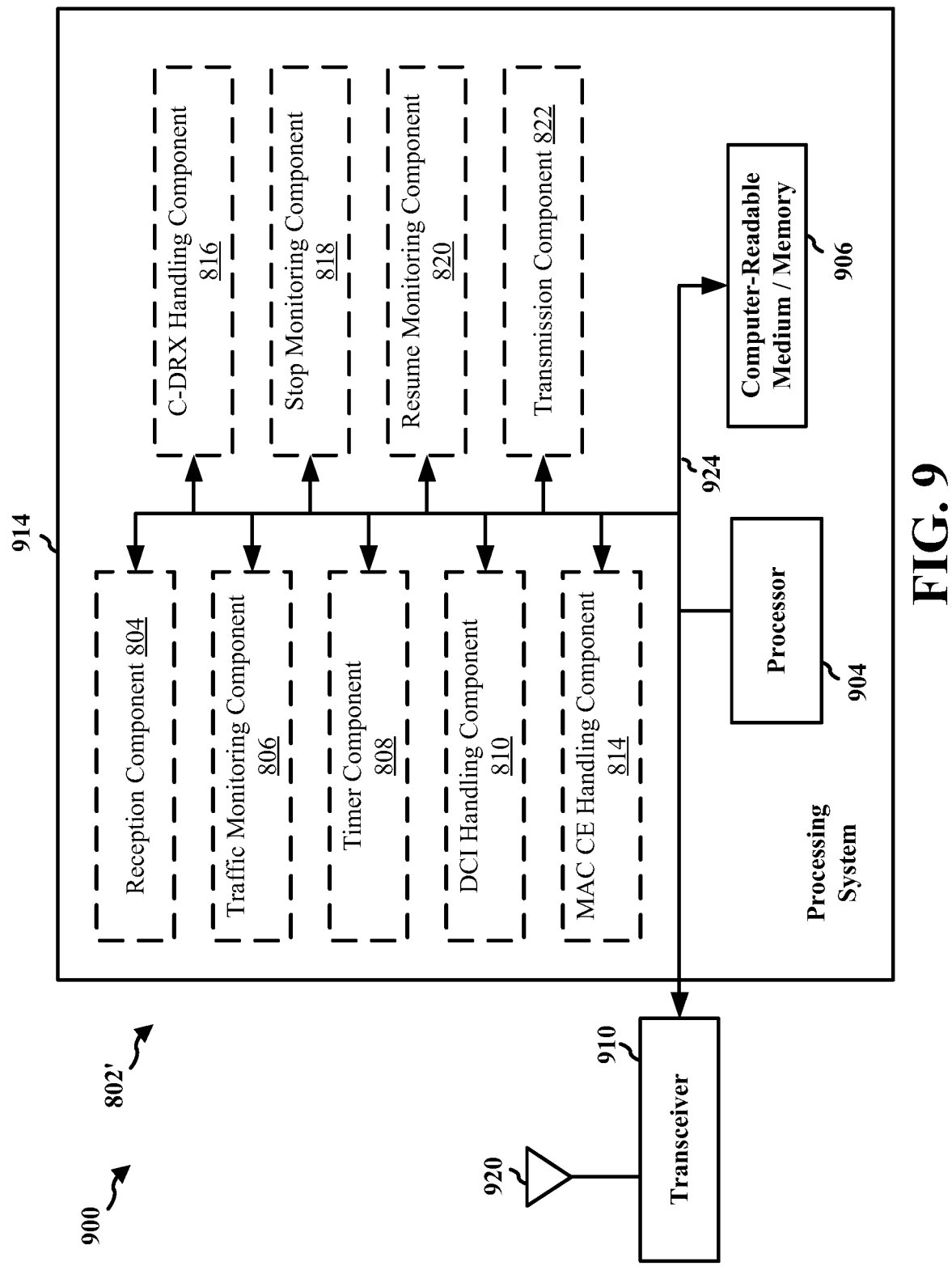
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 814, 816, 818, 820, 822 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 822, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 814, 816, 818, 820, 822. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359. Alternatively, the processing system 914 may be the entire UE (e.g., see the UE 350 of FIG. 3).

In one configuration, the apparatus 802/802' for wireless communication includes means for means for monitoring a PDCCH on an SCell. The apparatus 802/802' may also include means for stopping the PDCCH monitoring on the SCell in response to a monitoring-stoppage event. The apparatus 802/802' may also include means for resuming the PDCCH monitoring on the SCell in response to a monitoring-resumption event, and where the SCell remains active during a period between the stopping of the PDCCH monitoring and the resuming of the PDCCH monitoring. The apparatus 802/802' may also include means for determining an occurrence of the monitoring-stoppage event upon determining that a data traffic load fails to satisfy a minimum traffic threshold. The apparatus 802/802' may also include means for starting or restarting a timer in response to transmission of a new PUSCH or reception of a new PDSCH on the SCell. The apparatus 802/802' may also include means for determining an occurrence of the monitoring-stoppage event when the timer expires. The apparatus 802/802' may also include means for maintaining an active BWP on the SCell. The apparatus 802/802' may also include means for autonomously switching to a different BWP that does not include a PDCCH. The apparatus 802/802' may also include means for receiving DCI from a base station. The apparatus 802/802' may also include means for determining an occurrence of the monitoring-stoppage signaling based on receiving the DCI. The apparatus 802/802' may also include means for switching to a different BWP that does not include a PDCCH based on instructions in the received DCI. The apparatus 802/802' may also include means for receiving a MAC-CE from a base station, and where the MAC-CE indicates a set of SCells to stop monitoring. The apparatus 802/802' may also include means for determining an occurrence of the monitoring-stoppage event based on the received MAC-CE. The apparatus 802/802' may also include means for determining an occurrence of the monitoring-stoppage event in response to an occurrence of a predefined event, and where the predefined event is a start of an ON duration of a C-DRX cycle. The apparatus 802/802' may also include means for determining an occurrence of the monitoring-resumption event when a data traffic load on the SCell satisfies a traffic threshold. The apparatus 802/802' may also include means for receiving DCI from a fallback cell that the UE is monitoring. The apparatus 802/802' may also include means for determining an occurrence of the monitoring-resumption event based on the received DCI. The apparatus 802/802' may also include means for switching to a different BWP that includes a PDCCH based on instructions in the received DCI. The apparatus 802/802' may also include means for receiving a wakeup signal identifying the SCell. The apparatus 802/802' may also include means for determining an occurrence of the monitoring-resumption event based on receiving the wakeup signal. The apparatus 802/802' may also include means for receiving a MAC-CE from a base station, and where the MAC-CE indicates the UE is to resume PDCCH monitoring on a set of SCells. The apparatus 802/802' may also include means for determining an occurrence of the monitoring-resumption event based on the received MAC-CE. The apparatus 802/802' may also include means for determining an occurrence of the monitoring-resumption event in response to an occurrence of a predefined event, and where the predefined event includes a start of a C-DRX inactivity timer or a restart of the C-DRX inactivity timer. The apparatus 802/802' may also include means for receiving scheduling DCI on a search space of a PCell, and where the search space is linked to the SCell. The apparatus 802/802' may also include means for determining an occurrence of the monitoring-resumption event based on the received scheduling DCI, and where the UE resumes PDCCH monitoring on the SCell linked to the search space.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Techniques disclosed herein facilitate monitoring PDCCH when needed (e.g., when a traffic load is high). For example, disclosed techniques enable keeping a self-scheduling SCell active, but also enable a UE to stop monitoring PDCCH on the self-scheduling SCell when there is a period of inactivity in traffic. By keeping the self-scheduling SCell active, techniques disclosed herein may enable reducing UE power consumption and may also enable avoiding latency incurred by re-activating the SCell. Thus, techniques disclosed herein provide a low-latency technique for a UE to stop and restart monitoring PDCCH on a self-scheduling SCell.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   monitoring a physical downlink control channel (PDCCH) on a secondary cell (SCell), the UE configured for communication on a primary cell (PCell) and the SCell;
   receiving downlink control information (DCI);
   stopping PDCCH monitoring on the SCell in response to a monitoring-stoppage event, the monitoring-stoppage event comprising reception of the DCI;
   switching to a different bandwidth part (BWP) that does not include the PDCCH based on instructions in the DCI; and
   resuming the PDCCH monitoring on the SCell in response to a monitoring-resumption event, the SCell remaining active during a period between stopping the PDCCH monitoring and resuming the PDCCH monitoring.

2. The method of claim 1, wherein the DCI is received from a base station.

3. The method of claim 1, wherein the DCI is received from a fallback cell that the UE is monitoring while the PDCCH monitoring on the SCell is stopped, wherein the monitoring-resumption event comprises reception of the DCI from the fallback cell, the fallback cell being a cell different than the SCell.

4. The method of claim 3, wherein the fallback cell is a designated SCell.

5. The method of claim 3, wherein the fallback cell is the PCell.

6. The method of claim 1, wherein the monitoring-resumption event comprises a data traffic load on the SCell satisfying a traffic threshold.

7. The method of claim 1, wherein the UE is configured with connected mode discontinuous reception (C-DRX) and is configured to monitor a set of SCells, wherein the monitoring-stoppage event is based on a start of an ON duration of a C-DRX cycle, wherein stopping the PDCCH monitoring includes stopping the PDCCH monitoring on a subset of SCells of the set of SCells, the subset of SCells including one or more SCells of the set of SCells and including at least the SCell.

8. The method of claim 1, wherein the UE is configured with connected mode discontinuous reception (C-DRX) and the UE is configured to monitor a set of SCells, and the method further comprises:
   receiving a wakeup signal identifying a subset of SCells of the set of SCells, wherein the monitoring-resumption event is based on receiving the wakeup signal, and wherein resuming the PDCCH monitoring includes resuming the PDCCH monitoring on the subset of SCells, the subset of SCells including one or more SCells of the set of SCells.

9. The method of claim 1, wherein the UE is configured with connected mode discontinuous reception (C-DRX) and the UE is configured to monitor a set of SCells, wherein the monitoring-resumption event is based on a start of a C-DRX inactivity timer or a restart of the C-DRX inactivity timer, wherein resuming the PDCCH monitoring includes resuming the PDCCH monitoring on a subset of SCells of the set of SCells, the subset of SCells including one or more SCells of the set of SCells and including at least the SCell.

10. A method of wireless communication at a user equipment (UE), comprising:
   monitoring a physical downlink control channel (PDCCH) on a secondary cell (SCell), the UE configured for communication on a primary cell (PCell) and the SCell;
   stopping PDCCH monitoring on the SCell in response to a monitoring-stoppage event;
   receiving scheduling downlink control information (DCI) in a search space on the PCell, the SCell being linked to the search space, the scheduling DCI being for transmission of a new physical uplink shared channel (PUSCH) or for reception of a new physical downlink shared channel (PDSCH) in the search space on the PCell; and
   resuming the PDCCH monitoring on the SCell in response to a monitoring-resumption event, the SCell remaining active during a period between stopping the PDCCH monitoring and resuming the PDCCH monitoring, the UE resuming the PDCCH monitoring on the SCell linked to the search space in response to receiving the scheduling DCI in the search space on the PCell.

11. The method of claim 10, wherein the monitoring-stoppage event comprises determining that a data traffic load fails to satisfy a minimum traffic threshold.

12. A method of wireless communication at a user equipment (UE), comprising:
monitoring a physical downlink control channel (PDCCH) on a secondary cell (SCell), the UE configured for communication on a primary cell (PCell) and the SCell;
starting or restarting a timer in response to transmission of a new physical uplink shared channel (PUSCH) or reception of a new physical downlink shared channel (PDSCH) on the SCell;
stopping PDCCH monitoring on the SCell in response to a monitoring-stoppage event, the monitoring-stoppage event comprising an expiration of the timer; and
resuming the PDCCH monitoring on the SCell in response to a monitoring-resumption event, the SCell remaining active during a period between stopping the PDCCH monitoring and resuming the PDCCH monitoring.

13. The method of claim 12, wherein stopping the PDCCH monitoring includes autonomously switching to a different bandwidth part (BWP) that does not include the PDCCH if the timer expires.

14. An apparatus for wireless communication at a user equipment (UE), comprising:
means for monitoring a physical downlink control channel (PDCCH) on a secondary cell (SCell), the UE configured for communication on a primary cell (PCell) and the SCell;
means for receiving downlink control information (DCI);
means for stopping PDCCH monitoring on the SCell in response to monitoring-stoppage event, the monitoring-stoppage event comprising reception of the DCI;
means for switching to a different bandwidth part (BWP) that does not include the PDCCH based on instructions in the DCI; and
means for resuming the PDCCH monitoring on the SCell in response to a monitoring-resumption event, the SCell remaining active during a period between stopping the PDCCH monitoring and resuming the PDCCH monitoring.

15. The apparatus of claim 14, further comprising: means for receiving the DCI from a base station.

16. The apparatus of claim 14, further comprising: means for receiving the DCI from a fallback cell that the UE is monitoring while the PDCCH monitoring on the SCell is stopped, wherein the monitoring-resumption event comprises reception of the DCI from the fallback cell, the fallback cell being a cell different than the SCell.

17. The apparatus of claim 14, wherein the monitoring-resumption event comprises a data traffic load of the SCell satisfying a traffic threshold.

18. An apparatus for wireless communication at a user equipment (UE), comprising:
means for monitoring a physical downlink control channel (PDCCH) on a secondary cell (SCell), the UE configured for communication on a primary cell (PCell) and the SCell;
means for stopping PDCCH monitoring on the SCell in response to monitoring-stoppage event:
means for receiving scheduling downlink control information (DCI) in a search space on the PCell, the SCell being linked to the search space, the scheduling DCI being for transmission of a new physical uplink shared channel (PUSCH) or for reception of a new physical downlink shared channel (PDSCH) in the search space on the PCell; and
means for resuming the PDCCH monitoring on the SCell in response to a monitoring-resumption event, the SCell remaining active during a period between stopping the PDCCH monitoring and resuming the PDCCH monitoring, the UE resuming the PDCCH monitoring on the SCell linked to the search space in response to receiving the scheduling DCI in the search space on the PCell.

19. The apparatus of claim 18, wherein the monitoring-stoppage event comprises determining that a data traffic load fails to satisfy a minimum traffic threshold.

20. An apparatus for wireless communication at a user equipment (UE), comprising:
means for monitoring a physical downlink control channel (PDCCH) on a secondary cell (SCell), the UE configured for communication on a primary cell (PCell) and the SCell;
means for starting or restarting a timer in response to a transmission of a new physical uplink shared channel (PUSCH) or reception of a new physical downlink shared channel (PDSCH) on the SCell,
means for stopping PDCCH monitoring on the SCell in response to monitoring-stoppage event, the monitoring-stoppage event comprising an expiration of the timer; and
means for resuming the PDCCH monitoring on the SCell in response to a monitoring-resumption event, the SCell remaining active during a period between stopping the PDCCH monitoring and resuming the PDCCH monitoring.

21. An apparatus for wireless communication at a user equipment (UE), comprising:
a memory; and
at least one processor coupled to the memory and configured to:
monitor a physical downlink control channel (PDCCH) on a secondary cell (SCell), the UE configured for communication on a primary cell (PCell) and the SCell;
receive downlink control information (DCI);
stop PDCCH monitoring on the SCell in response to monitoring-stoppage event, the monitoring-stoppage event comprising reception of the DCI;
switch to a different bandwidth part (BWP) that does not include the PDCCH based on instructions in the DCI; and
resume the PDCCH monitoring on the SCell in response to a monitoring-resumption event, the SCell remaining active during a period between stopping the PDCCH monitoring and resuming the PDCCH monitoring.

22. The apparatus of claim 21, wherein the at least one processor is further configured to: receive the DCI from a base station.

23. The apparatus of claim 21, wherein the at least one processor is further configured to:
receive the DCI from a fallback cell that the UE is monitoring while the PDCCH monitoring on the SCell is stopped, wherein the monitoring-resumption event comprises reception of the DCI from the fallback cell, the fallback cell being a cell different than the SCell.

24. An apparatus for wireless communication at a user equipment (UE), comprising:
  a memory; and
  at least one processor coupled to the memory and configured to:
    monitor a physical downlink control channel (PDCCH) on a secondary cell (SCell), the UE configured for communication on a primary cell (PCell) and the SCell;
    stop PDCCH monitoring on the SCell in response to monitoring-stoppage event;
    receive scheduling downlink control information (DCI) in a search space on the PCell, the SCell being linked to the search space, the scheduling DCI being for transmission of a new physical uplink shared channel (PUSCH) or for reception of a new physical downlink shared channel (PDSCH) in the search space on the PCell; and
    resume the PDCCH monitoring on the SCell in response to a monitoring-resumption event, wherein the SCell remains active during a period between stopping the PDCCH monitoring and resuming the PDCCH monitoring, the UE resuming the PDCCH monitoring on the SCell linked to the search space in response to receiving the scheduling DCI in the search space on the PCell.

25. A non-transitory computer-readable medium storing computer executable code for wireless communication at a user equipment (UE), the computer executable code, when executed, to cause a processor to:
  monitor a physical downlink control channel (PDCCH) on a secondary cell (SCell), the UE configured for communication on a primary cell (PCell) and the SCell;
  receive downlink control information (DCI);
  stop PDCCH monitoring on the SCell in response to monitoring-stoppage event, the monitoring-stoppage event comprising reception of the DCI;
  switch to a different bandwidth part (BWP) that does not include the PDCCH based on instructions in the DCI; and
  resume the PDCCH monitoring on the SCell in response to a monitoring-resumption event, the SCell remaining active during a period between stopping the PDCCH monitoring and resuming the PDCCH monitoring.

* * * * *